Dec. 18, 1951 C. W. HANSELL 2,579,071

TIME DIVISION MULTIPLEX SYSTEM

Filed July 16, 1947 2 SHEETS—SHEET 1

INVENTOR.
CLARENCE W. HANSELL

BY Harry Tunick

ATTORNEYS.

Dec. 18, 1951 C. W. HANSELL 2,579,071

TIME DIVISION MULTIPLEX SYSTEM

Filed July 16, 1947 2 SHEETS—SHEET 2

INVENTOR.
CLARENCE W. HANSELL

BY Harry Tunick

ATTORNEY

Patented Dec. 18, 1951 2,579,071

UNITED STATES PATENT OFFICE 2,579,071

TIME DIVISION MULTIPLEX SYSTEM

Clarence W. Hansell, Port Jefferson, N. Y., assignor to Radio Corporation of America, a corporation of Delaware Application July 16, 1947, Serial No. 761,210

14 Claims. (Cl. 343—204)

This invention relates generally to time division pulse multiplex systems.

A time division pulse multiplex system, broadly stated, is one in which a common transmission medium is sequentially assigned or allotted to different branch circuits or channels. From each branch circuit or channel a pulse of energy is passed to the common transmission medium during the time period allotted to that particular branch circuit or channel. Each channel is customarily provided with an individual modulating circuit associated therewith for modulating a characteristic of the energy in that channel. Thus, there will be as many different modulating circuits as there are branch circuits or channels. The modulating circuit may include a source of speech waves, and where a pulse is produced in the channel, the speech waves may modulate the amplitude of the pulses in that particular channel. The sequentially occurring pulses in the common transmission medium may be used to modulate a radio transmitter for producing either a frequency modulated radio frequency output carrier wave or an amplitude modulated radio frequency carrier wave.

It will thus be seen that in the time division system, the outputs from many branch circuits or channels are placed on one carrier by applying the modulation corresponding to the individual channels separately and in sequence to the carrier.

At the receiver, the carrier wave is received, demodulated, and the different pulses from the different branch circuits or channels with the modulations thereon are passed into their respective channel circuits. Distributors, either electronic or mechanical, are employed at the transmitter and receiver ends of the system to sequentially assign the common circuit to the different branch circuits or channels. For various considerations, the pulse repetition rate for each channel (branch circuit) is generally 2.5 times the highest modulation frequency, and the pulse repetition rate is the same for all channels. The spacing between the centers of the adjacent channels may be approximately $1/n$ times the pulse period of one channel, where $n$ is the number of channels of the system.

One serious difficulty experienced in time division multiplex systems is caused by cross-talk between channels (branch circuits). Cross-talk in a multiplex system is the appearance of part of the signal of one channel in another channel. In a time division multipler system, cross-talk will result in circuits common to several or all channels of the system if the energy in the common circuit due to the modulation of a particular channel is not entirely dissipated before the time interval or intervals assigned to the succeeding channel or channels. Stated otherwise, interference between channels is caused generally by energy applied during one channel period decreasing too slowly so that some of it remains during the following one or more periods assigned to other channels. There would be no interference between channels if the energy of each channel were confined to its assigned time periods and the receiving commutator passed energy to each output circuit which was derived only from the transmitting end of that respective channel.

In conventional time division multiplex systems, the frequency bandwidths which would be required to hold cross-channel interference down to tolerable values are much greater than that which would be required to obtain adequate quality or reproduction in each channel. The bandwidth in the pulse circuits and consequently also in the radio circuit are thus determined by cross-talk considerations, in such conventional time division multiplex systems. These cross-talk considerations in conventional time division multiplex systems require a wide frequency spectrum, thus wasting channel space and, of course, causing receivers of the system to admit more interfering noise.

To assist in understanding the cross-talk problem in a time division multiplex system reference will now be made to an example using the amplitude modulated pulses illustrated in Fig. 1. In this figure, curve $a$ represents the variation with time of the voltage across a common circuit due to the signal in channel 1. The solid line represents the unmodulated signal. The dotted lines represent the limits of the amplitude of the voltage for a particular degree of plus and minus amplitude modulation. Curves $b$ and $c$ are the corresponding graphs of the voltage waves corresponding to channels 2 and 3 respectively. Curve $d$ is the combined signal of the three channels and is that signal which appears in some common circuits. The spaces CH—1, CH—2 and CH—3 represent the time intervals allotted to channels 1, 2, and 3, respectively. In the case of channel 2, Fig. 1, it will be observed that energy from channel 1 trails out into the time period which belongs to channel 2. Thus the modulation on channel 1 will appear at reduced level in channel 2. The ratio of the signal amplitude in channel 2 due to the modulation on channel 1 to the signal amplitude in channel 2 due to the modulation on channel 2 is the cross-talk ratio of the system for adjacent channels. As is usually the case, equal levels of signal input to all channels result in equal levels of signal output, that is, each channel has the same gain. In general, in the handling of telegraphy, telephony, facsimile, etc., by means of pulse time division multiplex systems it is necessary that the energy from one channel which interferes in another channel be held down to less than one part in $(10)^5$ or $(10)^6$.

If it were attempted to keep the waveform of the pulses representing successive channels so sharp on the sides (edges) as to prevent cross-talk between channels, there would be required an excessively wide frequency spectrum which wastes channel space. The future demand for channel space may soon be such as to compel the abandonment of time division multiplex systems utilizing a wide frequency spectrum.

The present invention overcomes the foregoing disadvantages and provides a time division multiplex system which utilizes a narrower total frequency spectrum than now realizable by conventional time division multiplex systems, and which is characterized by low cross-talk ratio between all of its channels.

Broadly stated, the present invention restricts, at the transmitter, the bandwidth of the communication circuit over which the pulses are transmitted, thereby unavoidably broadening the time length of the channel pulses which are combined in the common output circuit at the transmitting end of the time division pulse multiplex system in order to produce longer duration pulses having identical waveforms. The resulting narrower total frequency spectrum makes room for other communications systems, but introduces additional cross-talk due to overlapping of the sloping edges of the adjacent pulses with respect to time. It should be understood that the pulses are broadened in a common circuit so as to give identical frequency and phase distortion characteristics to all of the pulses. At the receiving end of the time division pulse multiplex system, the received radio frequency pulses are reproduced as a replica of the original waveform of the overlapping pulses found at the transmitting end, but cross-talk between channels is reduced or neutralized by a cross-talk balancer circuit. The result is a time division pulse multiplex system having a narrower total frequency spectrum but still having a low cross-talk ratio between all of its channels.

A more detailed description of the invention follows, in conjunction with a drawing, wherein.

Figure 3:
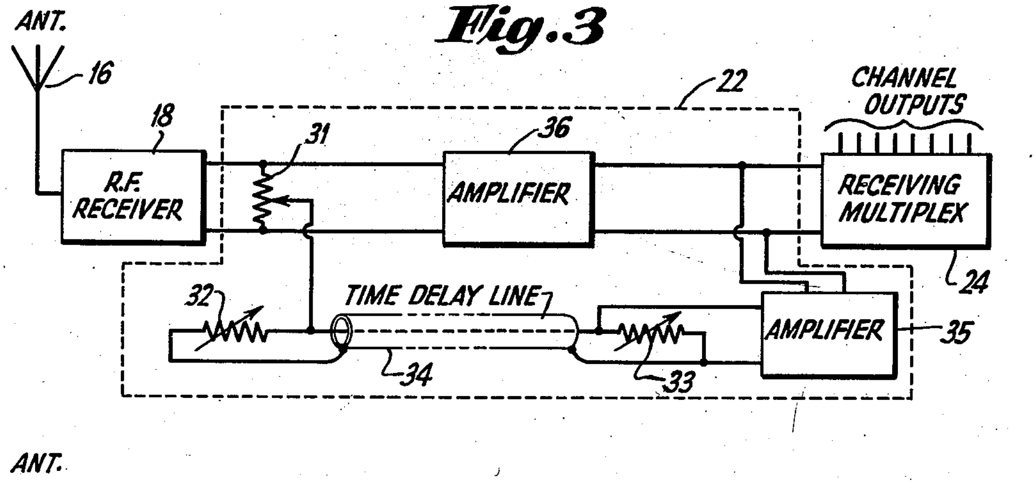
Figure 4:
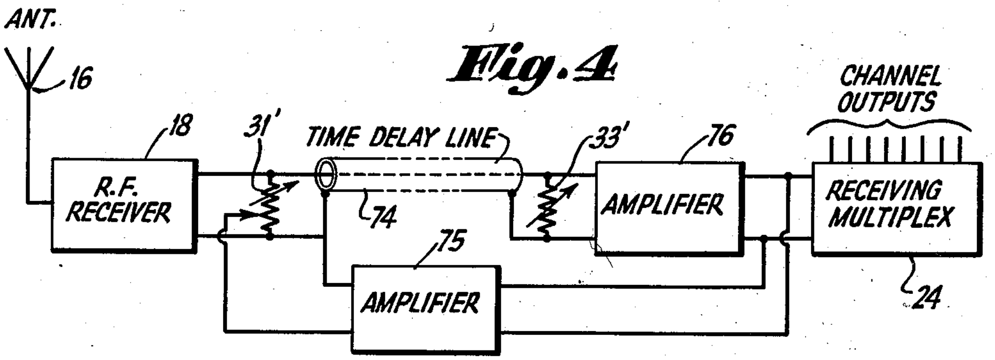
Figure 5:
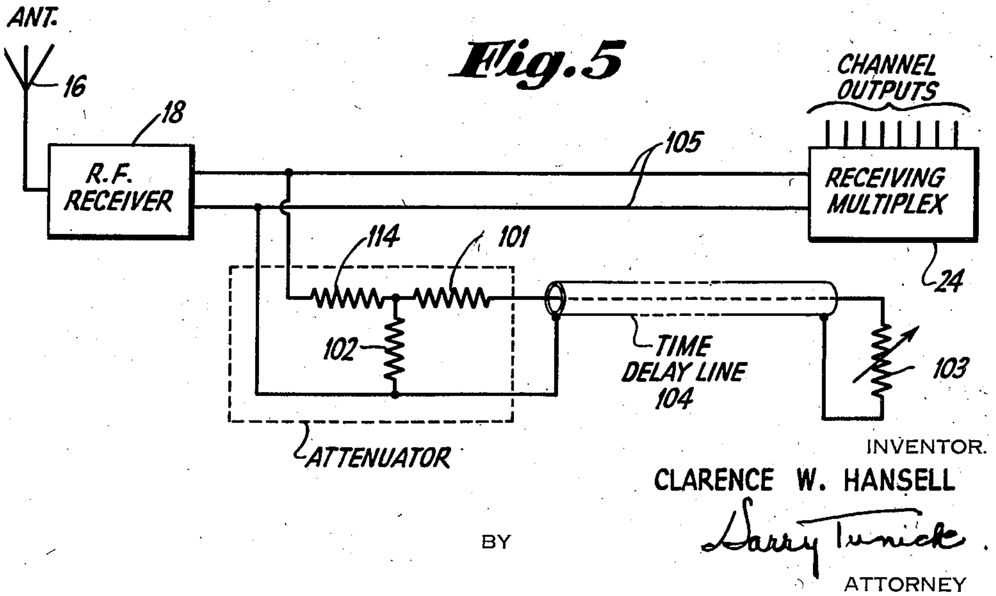

Figs. 3 and 4 illustrate two different embodiments of the invention employed at the receiver of a time division multiplex system for balancing out or minimizing cross-talk between channels due to long trailing edges of the pulses; and Fig. 5 illustrates an embodiment of the invention employed at the receiver of a time division multiplex system for balancing out or minimizing cross-talk between channels due to long leading edges of pulses.

Figure 2:
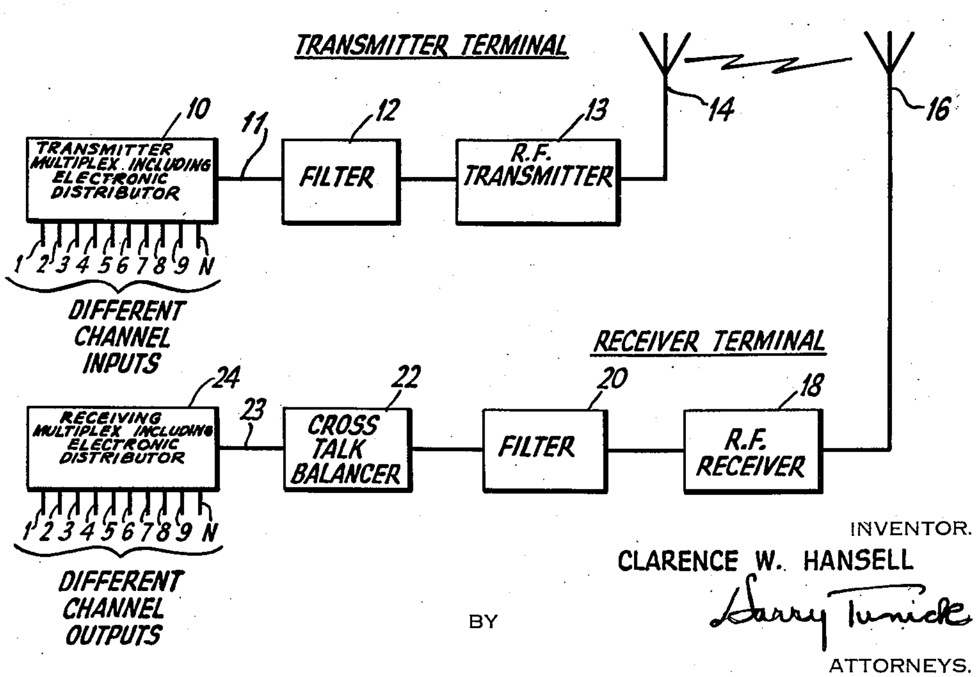
Fig. 2 illustrates, diagrammatically, in box form, a complete time division pulse multiplex system, in accordance with the invention.

Referring to Fig. 2 in more detail, there is shown a time division multiplex system in accordance with the invention, having a transmitting terminal (station) for radiating waves over an antenna 14, and a receiving terminal (station) for receiving the radiated waves on antenna 16. The transmitting terminal comprises suitable transmitting multiplex equipment 10 to which are supplied modulating currents from different channel inputs over leads 1, 2, 3, 4, 5, 6, 7, 8, 9—N etc. This equipment 10 comprises any suitable electronic distributor arrangement for deriving sampling pulses and for combining the pulses from the different channels and for passing these pulses in sequence to the common output lead 11. Each channel pulse will be modulated by the individual program or message wave in that channel, as a result of which there will appear in the common lead 11 sequentially appearing modulated pulses from the different channels. These pulses, by way of example, may be plus and minus amplitude-modulated and initially the pulses in common lead 11 are relatively narrow in time duration with relatively steep sloping edges, each pulse being completely distinct and separated from the others. This requires an extensively wide total frequency band. In order to reduce this frequency band to reasonable limits, I provide a bandpass filter 12 through which the combined pulses in the common circuit 11 must pass. This filter is, in effect, a frequency band reducing network (reducing with respect to frequency, but broadening with respect to time) which acts equally on all the signal pulses passing therethrough from lead 11, in order to give these signal pulses appearing in the output filter 12 identical frequency and phase distortion characteristics. The filter 12 can take any suitable known form for constructing a band pass filter. This filter will generally, though not necessarily, be a low pass filter. The resulting pulses appearing in the output of the filter 12 are broadened in time, thus increasing the cross-talk between channels above an ordinary permissible value.

Figure 1:
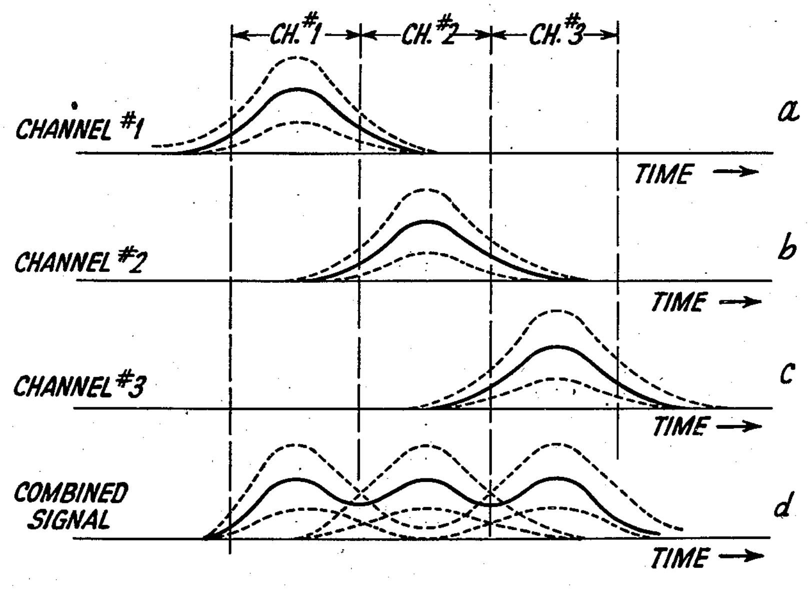
Fig. 1 is a series of curves which graphically illustrate how cross-talk is produced in an amplitude modulated time division multiplex system due to the sloping edges of the pulses.

The broadened output pulses from filter 12 are passed on to a radio frequency transmitter 13 for modulating the radio frequency carrier wave. These broadened pulses will have overlapping sloping edges in the manner somewhat similar to those shown in the curves of Fig. 1. The radio frequency transmitter 13 may be a frequency modulated type of transmitter wherein the frequency of the carrier wave deviates from the mean value in accordance with the amplitude and polarity of the pulses impressed thereon from the filter 12. The modulated radio frequency carrier wave from the transmitter 13 is radiated from antenna 14 without using an extensively large frequency band. Stated otherwise, the total frequency spectrum employed is now much narrower than can normally be employed if the filter 12 were not provided in the system.

The radiated signals are received at the receiver terminal or station on antenna 16 and passed along to a radio frequency superheterodyne receiver 18, and pulses are derived therefrom having the original waveform of the broadened combined pulses appearing in the output of the filter 12 at the transmitting terminal. Those pulses will have overlapping sloping edges. At the receiving terminal there is employed a frequency band reducing network 20 for keeping noise and interference to a minimum, which will be a band pass filter for restricting the reception substantially to the band of frequencies occupied by the transmitted pulses. Although this filter 20 is shown only in the video output circuit of the superheterodyne receiver 18, it should be understood that preferably its function should be performed very largely by frequency selectivity in the intermediate stages of the receiver 18 if the frequency stabilities of transmitter and receiver can be made good enough. Then the lowest possible threshold signal level is obtainable. The pulses which pass the filter 20 are then impressed upon the receiving multiplex equipment 24 through the cross-talk balancer circuit 22 and over lead 23. The balancer circuit 22 neutralizes or reduces the cross-talk which may be present due to distortion introduced in the signal waveform at the transmitter, and the details of these circuits are described hereinafter. The receiving multiplex apparatus 24 may be any suitable equipment known in the art for distributing the pulses to the different channel circuits 1, 2, 3, —N where the original modulation is reproduced. It will be understood, of course, that the pulses from channel 1 at the transmitter are passed on to channel 1 at the receiver and so forth. It is of course desirable that the overall frequency band width of the receiver 18 be not substantially wider than the received signal.

Fig. 3 shows the details of one form of the cross-talk balancer 22 used at the receiving terminal. This cross-talk balancer, in effect, bypasses a portion of each received pulse obtained from the radio receiver 18, delays this bypassed portion in a time delay line 34, inverts the polarity of this bypassed portion in amplifier 35 and balances out the net effect of the trailing edge of the same received pulse in the time allotted to a succeeding channel. It should be noted that there are two branches in the cross-talk balancer 22. One branch, which may be called the main branch, passes the main portion of the pulse through the buffer amplifier 36 to the terminal of the receiving multiplex equipment 24. The second branch which bypasses a portion of the received pulse includes an adjustable attenuator 31, the delay line 34 and the buffer amplifier 35. A resistance 32 is provided at the input end of the delay line 34 of a proper value so that, combined with attenuator 31 it will terminate the input end of delay line 34 in its characteristic impedance. The resistance 33 terminates the output end of the line so that no reflections occur. The attenuator resistor 31 adjusts the level of the input to the delay line 34. It should be noted that resistors 32 and 33 are adjustable in value, and that the tap on resistor 31 also provides an additional adjustment. By adjusting resistor 31 it is possible to vary the magnitude of the bypassed portion of the pulse passing through the delay line 34. Amplifiers 35 and 36 are vacuum tubes which isolate the input end of the delay line 34 from the output end and insure that, when the line is properly impedance matched at its ends, energy travels in one direction only over the line 34.

The delay line 34 is so adjusted and has such time constants that it provides a time delay for waves passing thereover approximately equal to the time space between the centers of adjacent channels. This line may be of the type which has uniformly distributed constants or one which has lumped constants. Resistor 33 may be of such value as to match the impedance of the delay line 34 at its output terminals, in which case if there is an overlap or residual cross-talk of the pulses in one channel appearing in another channel whose time period is subsequent to that of the immediately succeeding channel, the result will be that the residual cross-talk may be neutralized or balanced out in an adjacent channel but not in the second channel removed. This may be the particular case where the receiving pulses have very long trailing edges. In order to neutralize or reduce cross-talk not only in an immediately succeeding channel due to a pulse appearing in an immediately preceding channel, but also to reduce residual cross-talk appearing in the second channel removed, resistor 33 may be mismatched relative to the impedance of the delay line 34 to such an extent that a portion of the bypassed and delayed portion of the wave in line 34 will be reflected back toward resistors 32 and 31 so as to appear in the main path including amplifier 36 and balance out the residual in the second channel removed. The amplitude and polarity of this reflected wave is adjustable by varying resistor 33. The cross-talk balancer circuit 22 may take other forms for example any of those structures shown in Figs. 5, 6, 7, 15, 16 and 17 of my U. S. Patent No. 2,310,692, granted February 9, 1943 and those circuits in Affel Patent No. 1,921,063, granted August 8, 1933.

In cases where the pulses have a long leading edge, it is desirable to balance out those portions of the leading edge of the pulses in one channel which tend to appear in a preceding channel. This may be done by an arrangement shown in Fig. 4, wherein the main path or branch includes the delay line 74 and the by-pass branch includes the amplifier 75. In this case the major portion of the received pulse is delayed in line 74, while a portion is bypassed through amplifier 75 which is in a path or branch having substantially zero delay. The bypassed portion of the signal goes through the unidirectional amplifier 75 and appears at the input terminals of the receiving multiplex equipment 24 at a time sufficient to neutralize or balance out the leading edge of the main pulse which is delayed in line 74. The resistor 31′ is variable and serves to adjust the magnitude of the bypassed portion passing through amplifier 75 and also enables a matching of the resistance 31′ to the impedance of line 74. The resistor 33′ at the output end of the delay line 74 is also adjustable and serves to match or controllably slightly mismatch (if cross-talk is to be reduced in two or more channel periods following each signal channel period) the impedance of the line 74. Amplifier 76 is a unidirectional current passing vacuum tube and insures that energy travels in one direction only.

Fig. 5 illustrates an arrangement which is especially useful and simple. It shows a delay line 104 having half the electrical length of the lines of Figs. 3 and 4. In Fig. 5, one end of delay line 104 is terminated by adjustable resistor 103 for adjusting the magnitude and polarity of the wave reflected from the end of the delay line terminated by resistor 103. In such a system the bypassed portion of the pulse passes down the delay line 104 and part of it is reflected back to the main path comprising leads 105 at such time as to balance out, neutralize, or buck out the trailing edge of the same signal pulse at time periods corresponding to those allotted to succeeding channels. Resistors 101, 102 and 114 form an attenuator, which in cooperation with resistor 103 serve to adjust the magnitude of the bypassed portion of the main signal pulse. If the value of resistor 103 is extremely high, the effect is an open-ended delay line. If the value of resistor 103 is extremely low, the effect is a short-circuit at that end of the delay line 104 across which resistor 103 is connected. The open-ended line will cause a wave of the same polarity of voltage to be reflected back over the delay line, whereas a short-circuited line will cause a wave of the opposite polarity of voltage to be reflected back over the delay line. Likewise, if resistor 103 is only a little above, or a little below the value required to match the characteristic impedance of line 104 then a little of the wave will be reflected with the same or reversed polarity respectively. Either polarity and any degree of reflection up to 100% is obtainable by adjusting the value of resistor 103.

In summation, the present invention provides a time division multiplex system wherein the pulses in the common circuit are widened with respect to time in order to reduce the total frequency band required and this reduction in frequency band is carried to such an extent that communication is unacceptable as a commercial service due to the unavoidable cross-talk introduced between channels by the widened pulses. At the receiving terminal, the cross-talk between channels is neutralized in order to eliminate the added cross-talk and to restore the intelligibility to the received pulses. By means of the present invention I am able to provide a time division pulse multiplex system which is comparable in bandwidth to frequency band division systems without increasing the cross-talk between channels, which would not otherwise be possible because of the extensive communication channel frequency bandwidth required in conventional time division systems. The invention is primarily useful in a pulse time division multiplex system wherein the time intervals between pulses from adjacent channels are fixed, for example, in systems wherein modulation is applied by modulating the amplitude or width of the pulses.

An advantage of the invention lies in the fact that there is employed only a single delay line at the receiving terminal for all channels, as a result of which the system of the invention is extremely simple and relatively inexpensive to construct. In practice, the arrangement of Fig. 5, for example, has resulted in cross-talk reduction in a ratio as great as 40 decibels, or 10,000 to 1 in power, and less than a minute was required by an operator to arrive at the necessary adjustments of the resistors, which he made while listening to cross-talk in one channel from the preceding channel in the time sequence.

Also, as a result of applying the invention the transmitted power required to obtain an adequate final signal to noise ratio was reduced to such a degree as to make time division multiplex communication technically competitive with frequency band division multiplex systems.

What is claimed is:

1. A time division pulse multiplex system comprising a transmitting terminal having a plurality of channels each of which includes apparatus for producing a modulated wave, a common output circuit for said channels, means for sequentially connecting said common output circuit to channels, a frequency band reducing network in said common output circuit through which must pass the waves obtained from the channels and appearing in said common output circuit, a receiving terminal having apparatus thereat for reproducing waves having the same general waveform as those which pass through said network at the transmitting terminal, a distributor for distributing said reproduced waves to their respective channels, a cross-talk balancer, connections introducing said balancer between said distributor and said last apparatus, said balancer including means for abstracting a portion of the reproduced waves and for introducing said abstracted portion into said connections as a potential with such time delay, polarity and magnitude as to balance out the effect of undesired portions of said reproduced waves, to thereby reduce cross-talk between channels.

2. A time division pulse multiplex system comprising a transmitting terminal having a plurality of channels each of which includes apparatus for producing a modulated wave, a common output circuit for said channels, means for sequentially connecting said common output circuit to said channels, a frequency band reducing network in said common output circuit through which must pass the waves obtained from the channels and appearing in said common output circuit, a receiving terminal having apparatus thereat for reproducing waves having the same general waveform as those which pass through said network at the transmitting terminal, a distributor for distributing said reproduced waves to their respective channels, a cross-talk balancer, connections introducing said balancer between said distributor and said last apparatus, said balancer including two electrical branches in shunt to each other, one of said branches including a delay line, resistors terminating said delay line, said delay line and resistors having such constants that a wave appearing at the input end of said one branch appears at the output end as a potential of such polarity and magnitude and at such time as to oppose a portion of another wave passing over the other branch.

3. A time division pulse multiplex system comprising a transmitting terminal having a plurality of channels each of which includes apparatus for producing a modulated wave, a common output circuit for said channels, means for sequentially connecting said common output circuit to said channels, a frequency band reducing network in said common output circuit through which must pass the waves obtained from the channels and appearing in said common output circuit, a receiving terminal having apparatus thereat for reproducing waves having the same general waveform as those which pass through said network at the transmitting terminal, a distributor for distributing said reproduced waves to their respective channels, a cross-talk balancer, connections introducing said balancer between said distributor and said last apparatus, said balancer including two electrical branches in shunt to each other, a unidirectional amplifier in each branch for isolating the input from the output of that branch, one of said branches including a delay line, resistor networks terminating said line, at least one of said networks being adjustable, said line and resistor networks having such constants that a wave appearing at the input end of said one branch appears at the output end as a potential of such polarity and magnitude and at such time as to oppose a portion of another wave passing over the other branch.

4. A time division pulse multiplex system comprising a transmitting terminal having a plurality of channels each of which includes apparatus for producing a modulated wave, a common output circuit for said channels, means for sequentially connecting said common output circuit to said channels, a frequency band reducing network in said common output circuit through which must pass the waves obtained from the channels and appearing in said common output circuit, a receiving terminal having apparatus thereat for reproducing waves having the same general waveform as those which pass through said network at the transmitting terminal, a distributor for distributing said reproduced waves to their respective channels, a cross-talk balancer, connections introducing said balancer between said distributor and said last apparatus, said balancer including a circuit coupling said distributor to said apparatus and a time delay line connected at one end to said last circuit through an attenuator, means for terminating the other end of said line such that a wave appearing at the input end of said line and traveling thereover is reintroduced in said circuit as a potential of such polarity and magnitude and at such time as to oppose a portion of another wave passing over said circuit.

5. A time division pulse multiplex system comprising a transmitting terminal having a plurality of channels each of which includes apparatus for producing a modulated wave, a common output circuit for said channels, means for sequentially connecting said common output circuit to said channels, a frequency band reducing network in said common output circuit through which must pass the waves obtained from the channels and appearing in said common output circuit, a receiving terminal having apparatus thereat for reproducing waves having the same general waveform as those which pass through said network at the transmitting terminal, a distributor for distributing said reproduced waves to their respective channels, a cross-talk balancer, connections introducing said balancer between said distributor and said last apparatus, said balancer including a circuit coupling said distributor to said apparatus, and a time delay line connected solely at one end to said last circuit through a resistor network, means terminating the other end of said delay line such that a wave traveling over the line is reflected back to the input end after a predetermined interval of time determined by the time constants of the line and with a desired polarity.

6. A time division pulse multiplex system comprising a transmitting terminal having a plurality of channels each of which includes apparatus for producing a pulse, a common output circuit, a distributor for sequentially coupling said common output circuit to said channels, a band pass filter in said common output circuit through which the channel pulses pass, said filter effectively widening said pulses and introducing identical frequency and phase distortion characteristics on said pulses, a receiving terminal having apparatus thereat for reproducing pulses having the waveform of said widened pulses, means including a delay line at the receiving terminal for abstracting a portion of each reproduced pulse and for reintroducing said abstracted portion with such polarity and magnitude and at such time as to neutralize a portion of a succeeding or preceding widened pulse, to thereby reduce cross-talk between channels, and a distributor for sequentially coupling the resultant neutralized pulses into their respective channels.

7. A time division pulse multiplex radio system comprising a transmiting terminal having a plurality of channels each of which includes apparatus for producing time spaced pulses and for modulating a characteristic thereof, a common output circuit, a distributor for sequentially coupling said common output circuit to said channels, the pulses appearing in said common output circuit from said channels being relatively narrow and non-overlapping, a radio transmitter coupled to said common output circuit, a frequency band reducing network in said common output circuit through which the channel pulses must pass before being impressed on said radio transmitter, as a result of which said channel pulses are widened and the edges of adjacent pulses are caused to overlap, a receiving terminal having a radio receiver for receiving and detecting the radio wave to thereby reproduce pulses having the waveform of the widened pulses, means at the receiving terminal for restricting reception substantially to the band of frequencies occupied by the widened transmitted pulses, and means including a delay line at the receiving terminal for abstracting a portion of each reproduced pulse and for reintroducing said abstracted portion with such polarity and magnitude and at such time as to neutralize a portion of a succeeding or preceding widened pulse, to thereby reduce cross-talk between channels, and a distributor for sequentially coupling the resultant neutralized pulses into their respective channels.

8. A time division multiplex radio system comprising a transmitting terminal having a plurality of channels each of which includes means for producing a signal, an electronic distributor at the transmitting terminal and coupled to said channels for sequentially pulse sampling the signals in said channels for spaced discrete intervals of time, a common output circuit coupled to said distributor for deriving from said channels a series of time spaced direct current pulses, a frequency band reducing network in said common output circuit through which the channel pulses must pass whereby said channel pulses are deliberately widened and the edges of adjacent pulses are caused to overlap, a frequency modulation transmitter coupled to the output of said frequency band reducing network for transmitting frequency modulated signals, a receiving terminal having a radio receiver for receiving and detecting the incoming signals to thereby reproduce pulses having the waveform of the widened pulses, means at the receiving terminal for restricting reception substantially to the band of frequencies occupied by the widened transmitted pulses, and means including a cross-talk balancing circuit for reducing the width of said widened received pulses, and a distributor following and coupled to said means for sequentially coupling the resultant neutralized pulses into their respective channels.

9. A time division pulse multiplex system comprising a transmitting terminal having a plurality of channels each of which includes apparatus for producing an amplitude modulated pulse, a common output circuit, a distributor for sequentially coupling said common output circuit to said channels, a low pass filter in said common output circuit through which the channel pulses pass, said filter effectively widening said pulses and introducing identical frequency and phase distortion characteristics on said pulses, a frequency modulation radio transmitter coupled to the output of said filter, a receiving terminal having superheterodyne receiving apparatus thereat for reproducing pulses having the waveform of said widened pulses, means including a delay line at the receiving terminal for abstracting a portion of each reproduced pulse and for reintroducing said abstracted portion with such polarity and magnitude and at such time as to neutralize a portion of a succeeding or preceding widened pulse, to thereby reduce cross-talk between channels, and a distributor for sequentially coupling the resultant neutralized pulses into their respective channels.

10. A time division multiplex radio system comprising a transmitting terminal having a plurality of branch circuits each of which includes means for producing a signal, an electronic distributor for sequentially pulse sampling the signals in said branch circuits for spaced discrete intervals of time, a common output circuit coupled to said distributor for deriving from said branch circuits a series of time spaced direct current pulses, radio frequency sending apparatus coupled to said common output circuit, and a frequency band reducing network in said common output circuit through which the branch circuit pulses must pass before being impressed on said radio frequency sending apparatus, the band of frequencies passed by said frequency band reducing network being sufficiently narrow so that all of the frequencies necessary to reproduce said pulses in a non-overlapping manner cannot be passed whereby said branch circuit pulses are deliberately widened and the edges of adjacent pulses are caused to overlap.

11. A time division pulse multiplex radio system comprising a transmitting terminal having a plurality of channels each of which includes apparatus for producing time spaced pulses and for modulating a characteristic thereof, a common output circuit, a distributor for sequentially coupling said common output circuit to said channels, means in said common output circuit for widening said pulses to give them sloping overlapping edges, apparatus for transmitting energy representative of said widened pulses, apparatus for receiving said energy and reproducing said widened pulses, and a balancer circuit for causing a portion of each reproduced widened pulse to neutralize a sloping side of the same or another reproduced pulse, whereby the result is a series of pulses having substantially non-overlapping edges, and means for separating said last pulses into their respective channels.

12. A time division multiplex radio system comprising a transmitting terminal having a plurality of branch circuits, each of which includes means for producing a signal, a distributor for sequentially pulse sampling the signals in said branch circuits for spaced intervals of time, a common output circuit coupled to said distributor for deriving from said branch circuits a series of pulses, the pulses appearing in said common output circuit from said branch circuits being substantially non-overlapping, radio frequency sending apparatus coupled to said common output circuit, and a frequency band reducing network in said common output circuit through which the branch circuit pulses must pass before being impressed on said radio frequency sending apparatus, the band of frequencies passed by said frequency band reducing network being sufficiently narrow so that all of the frequencies necessary to reproduce said pulses in substantially non-overlapping manner cannot be passed whereby the pulses appearing in the output of said network are widened and the edges of adjacent pulses are caused to overlap.

13. A time division multiplex system in accordance with claim 12 wherein the signals in said branch circuits are amplitude modulated pulses, said distributor is electronic, and the said radio frequency sending apparatus is a frequency modulation transmitter.

14. A time division multiplex radio system comprising a transmitting terminal having a plurality of channels each of which includes apparatus for producing time spaced pulses and for modulating the amplitude thereof, a common output circuit, a distributor for sequentially coupling said common output circuit to said channels, means in said common output circuit for widening said pulses to give them sloping overlapping edges, radio frequency carrier producing apparatus for transmitting energy representative of said widened pulses, apparatus for receiving said energy and reproducing said widened pulses, and a circuit for causing a portion of each reproduced widened pulse to neutralize a sloping side of the same or another reproduced pulse, whereby the result is a series of pulses having non-overlapping edges, and means for separating said last pulses into their respective channels.

CLARENCE W. HANSELL.

REFERENCES CITED

The following references are of record in the file of this patent:

UNITED STATES PATENTS

| Number | Name | Date |
|---|---|---|
| 1,921,063 | Affel | Aug. 8, 1933 |
| 2,055,309 | Ramsey | Sept. 22, 1936 |
| 2,092,442 | Colwell | Sept. 7, 1937 |
| 2,118,626 | Smith | May 24, 1938 |
| 2,216,545 | Cannon | Oct. 1, 1940 |
| 2,220,689 | Shore | Nov. 5, 1940 |
| 2,227,057 | Blumlein | Dec. 31, 1940 |
| 2,248,757 | Herold | July 8, 1941 |
| 2,266,154 | Blumlein | Dec. 16, 1941 |
| 2,271,909 | Beverage | Feb. 3, 1942 |
| 2,310,692 | Hansell | Feb. 9, 1943 |
| 2,326,584 | Van Zelst | Aug. 10, 1943 |
| 2,410,350 | Labin et al. | Oct. 29, 1946 |
| 2,418,127 | Labin | Apr. 1, 1947 |
| 2,421,138 | Wheeler | May 27, 1947 |